United States Patent [19]
Ohkado et al.

[11] Patent Number: 4,699,934
[45] Date of Patent: Oct. 13, 1987

[54] SOFT CONTACT COMPOSITION AND METHOD

[75] Inventors: Shinzo Ohkado, Kyoto; Hideki Kenjo, Otsu, both of Japan

[73] Assignee: Toray Industries, Inc., Tokyo, Japan

[21] Appl. No.: 517,567

[22] Filed: Jul. 28, 1983

Related U.S. Application Data

[60] Continuation of Ser. No. 274,735, Jun. 18, 1981, abandoned, which is a division of Ser. No. 190,820, Sep. 25, 1980, Pat. No. 4,347,198, which is a continuation of Ser. No. 940,318, Sep. 7, 1978, abandoned.

[30] Foreign Application Priority Data

Sep. 12, 1977 [JP] Japan ................................ 52-108925
Sep. 12, 1977 [JP] Japan ................................ 52-108926

[51] Int. Cl.$^4$ ............................................. C08L 33/14
[52] U.S. Cl. ................................... 523/106; 523/108; 524/173
[58] Field of Search ................................ 523/106, 108

[56] References Cited

U.S. PATENT DOCUMENTS

| Re. 27,401 | 6/1972 | Wichterle et al. | 523/106 |
|---|---|---|---|
| 3,532,679 | 10/1970 | Steckler | 526/260 |
| 3,558,568 | 6/1967 | Kobayashi et al. | 524/173 |
| 3,812,071 | 5/1974 | Stoy | 523/106 |
| 3,876,581 | 4/1975 | Neogi | 523/106 |
| 3,937,680 | 2/1976 | de Carle | 523/108 |
| 3,947,401 | 3/1976 | Stamberger | 523/106 |
| 3,949,021 | 4/1976 | Kunitomo et al. | 525/244 |
| 3,985,697 | 10/1976 | Urbach | 523/106 |
| 4,022,754 | 5/1977 | Howes et al. | 528/503 |
| 4,039,501 | 8/1977 | Babcock et al. | 524/173 |
| 4,085,168 | 4/1978 | Milkovich et al. | 523/106 |

OTHER PUBLICATIONS

Kirk-Othmer, Encyclopedia of Chemical Technology, 3d Ed, vol. 8, p. 548.

Primary Examiner—Joseph L. Schofer
Assistant Examiner—N. Sarofin
Attorney, Agent, or Firm—Wegner & Bretschneider

[57] ABSTRACT

A soft contact lens is provided by: pouring an excess amount of an original solution for producing a soft contact lens into a concave mold; placing a convex mold on said concave mold and overflowing the excess of said original solution to thereby uniformly fill said original solution in a space between said concave mold and said convex mold; gelling said original solution between the two molds to form therebetween a lens having a tensile strength of at least about 0.1 kgf/cm$^2$; immersing said lens and said two molds in a liquid to peel said lens from said molds; and extracting the thus-peeled lens via an extraction treatment with water. The "original solution" contains:

a component A selected form the group consisting of monomers and hydrophilic polymers, wherein the monomers yield hydrophilic components when polymerized; a component B, which is a hydrophobic polymer having ethylenic double bonds in its side chains as post-cross-linkable groups, and a solvent C, the weight ratio of A:B being from about 85:15 to about 55:45 and solvent C being about 5 to 95% by weight.

10 Claims, 3 Drawing Figures

SOFT CONTACT COMPOSITION AND METHOD

This application is a continuation of U.S. application Ser. No. 274,735, filed June 18, 1981, now abandoned, which is a division of application Ser. No. 190,820 filed Sept. 25, 1980, now U.S. Pat. No. 4,347,198, which is a continuation of application Ser. No. 940,318, filed Sept. 7, 1978, now abandoned.

SUMMARY OF THE INVENTION

The present invention provides a process for producing in a facile manner a high-quality soft contact lens with little deviation in quality at a high yield, and an "original solution" for producing the soft contact lens used in said process.

The present invention provides soft contact lens from an original solution that is filled into a concave and convex molds, the monomeric and/or polymeric mixture being gelled, the resultant gelled polymer then being peeled from the mold and finally extracted via water treatment. The "original solution" is a mixture of monomers and/or polymers more fully defined hereinafter together with a solvent and optional ingredients also set forth below, this "original solution" being transformed into the soft contact lens through filling it into the concave and convex molds, preferably made of glass; polymerizing to a gel; peeling; and finally extracting.

In its generic aspect, the invention provides a process for producing the soft contact lens through pouring an excess amount of original solution for producing a soft contact lens into a concave mold; placing a convex mold on said concave mold and overflowing the excess of said original solution to thereby uniformly fill said original solution in a space between said concave mold and said convex mold; gelling said original solution between the two molds to form therebetween a lens having a tensile strength of at least about 0.1 kgf/cm$^2$, immersing said lens and said two molds in a liquid to peel said lens from said molds; and extracting the thus-peeled lens via an extraction treatment with water.

In accordance with subgeneric aspects of the invention, the original solution has a coefficient of gellation contraction at the same temperature and pressure of less than about 5% by volume. In one embodiment of the invention, the original solution contains N-vinyl lactam and a lower alkyl ester of acrylic acid or methacrylic acid. In a further embodiment, the original solution contains a polymer of a lower alkyl ester of methacrylic acid having an ethylenic double bond in the side chain and N-vinyl lactam. The two molds are preferably made of glass, and the convex mold preferably has a non-interference surface.

In a preferred embodiment, the gellation step is caused by heating. A preferred embodiment of the peeling step utilizes a dimethyl sulfoxide-water mixture.

The original solution is a component A selected from the group consisting of monomers and hydropholic polymers, wherein the monomers yield hydrophilic components when polymerized; a component B, which is a hydrophobic polymer having ethylenic double bonds in its side chains as post-cross-linkable groups, and a solvent C,
the weight ratio of A:B being from about 85:15 to about 55:45 and solvent C being about 5 to 95% by weight.

It is to be understood that the term "monomer" as defined above there is included the partially polymerized form which has not reached the stage of gellation, particularly with respect to the monomer component B.

Through the present invention it is possible to obtain a soft contact lens which is optically homogenous and without bubbles, despite the shape of the lens. Another problem that is avoided is the problem of "hollows", which may be caused through polymerization contraction. In some prior art methods an original solution flows slightly inside the molds, so that a memory of such flow develops after the hydration. A further problem avoided by the present invention concerns the problems with finishing lenses made by polymerization contraction, such finishing not being required for the present invention.

DETAILED DESCRIPTION OF THE INVENTION

Figure 1:
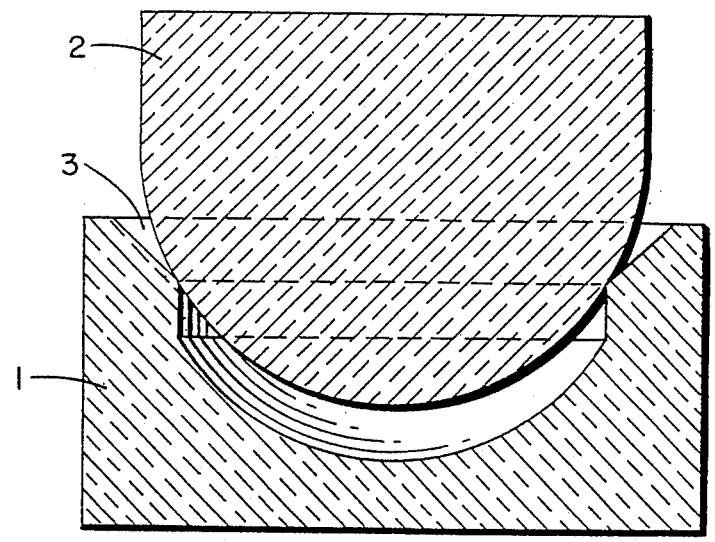

The process for producing a soft contact lens according to the present invention consists mainly of the following four steps.
 (1) a filling step
 (2) a gellation step
 (3) a peeling step
 (4) an extracting step In the filling step an original solution for producing a soft contact lens is filled in a space between concave and convex molds. The "original solution" contains the following components A, B and C, the ratio of the component A to the component B ranges from about 85:15 through about 55:45 and the content of the component C is about 5–95% by weight.

A. at least one kind selected from the group consisting of a monomer which gives a hydrophillic component when polymerized and a hydrophillic polymer
 B. at least one kind selected from the group consisting of a monomer which gives a hydrophobic component when polymerized and a hydrophobic polymer
 C. a solvent.

In addition to the above, a cross-linking agent may be used and a polymerization initiator may also be included.

As monomer of the component A there may be mentioned an N-vinyl lactam such as N-vinyl pyrrolidone, N-vinyl piperidone and N-vinyl caprolactam; N-vinyl oxazolidone; a hydroxy lower alkyl ester of acrylic acid or methacrylic acid such as hydroxyethyl or hydroxypropyl ester of acrylic acid or methacrylic acid; glycerin monoacrylate or glycerin monomethacrylate; and an ortho-lactone having a hydrophilic group. As used above and throughout the description of the invention, as preferred lower alkyl may be mentioned alkyl of up to 6 carbon atoms.

The hydrophilic polymer of the component A is a cross-linkable hydrophilic polymer having functional group(s) adequate to form a cross-linkage between one hydrophilic polymer and another (post cross-linking). Illustrative of such hydrophilic polymer is the product obtained by (co)polymerizing one kind or at least two kinds of said monomer of the component A and, if necessary, a monomer for introducing functional group(s) to a polymer (functional group-introducing monomer). As said functional group-introducing monomers there may be mentioned n-butoxymethylacrylamide, glycidyl methacrylate, vinylene carbonate, hydroxyethyl methacrylate, hydroxyethyl acrylate, vinyl methacrylate, vinyl acrylate, methacrylic acid and acrylic acid. The copolymerization ratio of the monomer to the functional group-introducing monomer is preferably within the range of about 1000:1 to about 10:1. Of those illustrated above especially preferred is the product obtained by copolymerizing N-vinyl pyrrolidone as the monomer and vinylene carbonate as the functional group-introducing monomer.

As another example of such a hydrophilic polymer, polyvinyl alcohol may be cited. In this case, hydroxyl groups in the polymer enable a post cross-linking reaction to take place; therefore, a new functional group need not be introduced. The post cross-linking reaction may be carried out by using a polyvalent isocyanate, a polyvalent aldehyde and methylol melamine as a post cross-linking agent.

Said monomer which when polymerized, gives a hydrophobic component of the component B points to what is not cross-linked when it is made a high molecular weight substance, yet neither swells nor dissolves in water. As such monomer, there may be cited a lower alkyl ester of acrylic acid or methacrylic acid (for example, methyl methacrylate); an unsaturated nitrile such as acrylonitrile or methacrylonitrile; an aromatic olefin such as styrene and a hydrophobic ortholactone.

When monomers are used as said component A and said component B, it is desirable that one monomer is unlikely to be copolymerized with the other monomer, and it is also desirable that monomer reactivity ratios are:

$$1/r_A > 1 \text{ and } 1/r_B > 1$$

(wherein $r_A$ is a reactivity ratio of the monomer of the component A to the monomer of the component B, and the ratio of the possibility that A is added to an A-terminated polymer to the possibility that B is added thereto; $r_B$ is a reactivity ratio of the monomer of the component B to the monomer of the component (A). In this case, when acrylic acid or methacrylic acid is added in an amount up to about 5% by weight based on the entire monomers as a third monomer component, it becomes possible to raise the water content without lowering the tenacity of the lens.

Said hydrophobic polymer of the component B points to a cross-linkable polymer having functional group(s) adequate for forming a cross-linkage between one hydrophobic polymer and another (post cross-linking) and neither swells nor dissolves in water. Representative of such cross-linkabe hydrophobic polymer is the product obtained by (co)polymerizing one kind or at least two kinds of said monomer of the component B and, if necessary, said functional group-introducing monomer. It is preferable that the copolymerization composition ratio of the monomer to the aforesaid functional group-introducing monomer generally ranges from about 1000:1 to about 10:1. As a hydrophobic polymer, a non-cross-linking polymer, for example, polyvinyl butyral may be mixed.

In both cases of polymers of the component A and the component B, when a hydroxyl group is contained as a functional group, it is possible to make said polymer, a post-cross-linkable polymer by esterifying said hydroxyl group with, for example, methacrylic acid to thereby introduce an ethylenic double bond to the side chain. As to combination of the component A with the component B, such combination as to give an original solution whose coefficient of gellation contraction at the same temperature and the same pressure (hereinafter referred to as $\gamma_o$) is less than about 5% by volume, is preferable. More specifically, there are the following preferable combinations.

(1) Combination of monomers used both as the component A and the component B:
   N-vinyl lactam, especially N-vinyl pyrrolidone as the component A.
   A lower akyl ester of acrylic acid or methacrylic acid, especially methyl methacrylate as the component B.

(2) Combination of a monomer used as the component A with a polymer used as the component B:
   N-vinyl lactam, especially N-vinyl pyrrolidone as the component A.
   A polymer having an ethylenic double bond in the side chain, obtained by reacting (esterifying) methacrylic acid with a lower alkyl ester of methacrylic acid (especially, methyl methacrylate)glycidyl methacrylate copolymer, or a non-gelled copolymer of methyl methacrylate and vinyl methacrylate as the component B.

(3) Combination of polymers used both as the component A and the component B:
   A polymer obtained by reacting (esterifying) methacrylic acid with a hydrolyzed N-vinyl pyrrolidone-vinylene carbonate copolymer as the component B.
   A non-gelled copolymer of methyl methacrylate and vinyl methacrylate as the component B.

(4) Combination of a post cross-linkable polymer and a monomer used as the component A and a monomer used as the component B:
   This combination is effective because it imparts a proper viscosity to an original solution for polymerization.

Of the foregoing, what is especially preferable is combination of N-vinyl pyrrolidone with methyl methacrylate.

It is necessary that the mixing ratio of the component A to the component B should range from about 85:15 to about 55:45. In case the amount of the component A exceeds the upper limit of said range, viz. about 85%, a high-tenacity lens cannot be obtained, and in case the amount of the component A becomes less than about 55%, a lens having a high water content cannot be obtained. If said ratio is within the aforesaid range, a lens having a high tenacity and a high water content that are well balanced is obtainable.

The solvent component C must be one that does not obstruct the polymerization reaction and the post crosslinking reaction, and such solvent as to give a transparent original solution is preferable. When a solvent giving an opaque original solution is used, the lens is unsatisfactory in optical properties, and also in many cases in dynamic properties.

In case both the component A and the component B are monomers, it is not necessarily required that a solvent be used which is capable of simultaneously dissolving polymers of the two components. Insofar as it is a solvent dissolving either one of the two components, any solvent may be usable. It is possible to select a solvent from a wide range depending upon combination of the component A with the component B. In case N-vinyl pyrrolidone is combined with methyl methacrylate, which is an especially preferable mode of practice of the present invention there is preferably used dimethyl sulfoxide and/or ethylene carbonate or an organic solvent system obtained by adding a small amount of dioxane to them. In case a polymer of N-vinyl pyrrolidone is used as the component A and a polymer of methyl methacrylate is used as the component B, dimethyl formamide, N-methyl pyrrolidone and dimethyl acetamide they may be used as a solvent, as they simultaneously dissolve the two polymers.

It is necessary that the amount of the solvent used be within the range of about 5–95% by weight based on the total amount of the original solution; of said range, the range of about 30–90% by weight is preferable, and the range of about 50–90% by weight is most preferable. In case the amount of the solvent exceeds about 95% by weight, the tensile strength of a solvent-containing gel obtained by polymerizing and/or cross-linking the original solution becomes low, therefore, handling of the solvent-containing lens becomes somewhat difficult.

It is preferable to so adjust the original solution as to make the tensile strength of a solvent-containing gel, not less than about 0.1 kg f/cm$^2$; and for that end, it is necessary not only to make the amount of the solvent within the aforesaid range, but also to carefully select the kind of solvent. When the amount of the solvent becomes less than about 5% by weight, a hydrated lens upon swelling is hard, the water content of the lens becomes low or the lens undergoes permanent deformation to such an extent that parts of the molecules are destroyed due to a swelling force. What is most preferable is that dimensional change brought about when a solvent contained in a gel is substituted by water, is within the range of from about +20% through about −30%.

The cross-linking agent will now be considered: When a polymer is used as the component A or B, post cross-linking agent reacting with the functional group(s) of the polymer to form cross-linkage between one polymer molecule and another, is used as occasion demands. As a post cross-linking agent, whatever substance is usable unless it changes essentially the properties of the polymer. For a polymer containing hydroxyl group(s) as a functional group, a polyvalent isocyanate, a polyvalent aldehyde and a polyvalent carboxylic acid ester are usable as a post cross-linking agent. When a polymerizable monomer is used as the component A or B, a cross-linking agent is added to advance a cross-linking polymerization. The cross-linking agent is selected from compounds each having at least two polymerizable unsaturated bonds in the same molecule.

As such cross-linking agents, may be mentioned di- or tri-allyl compounds such as diallyl succinate, diallyl phthalate, diallyl maleate, diethylene glycol bis-allyl carbonate, triallyl cyanurate, triallyl isocyanurate, triallyl phosphate and triallyl trimellitate; a di- or tri-vinyl compound such as divinyl benzene, N,N'-methylene bis acrylamide, (poly)ethylene glycol dimethacrylate, hexamethylene bis maleimide, divinyl urea, bisphenol A bis methacrylate, divinyl adipate, glycerin trimethacrylate, trimethylol propane triacrylate, trivinyl trimelitate and 1,5-pentadiene; an allylvinyl compound such as allyl acrylate and allyl methacrylate; and vinyl (meth)acrylate. The amount of such cross-linking agent to be added is within the range of about 0.005–20 mol % based on the total amount of the polymerizable monomers of the component A and the component B.

A cross-linking polymerization is carried out by such means as heat, rays and electronic rays in the presence of a polymerization initiation if necessary. As preferred examples of such a polymerization initiator, there may be mentioned an organic peroxide such as di-tert-butyl peroxide, benzoyl peroxide, 2,4-dichlorobenzoyl peroxide, tert-butyl hydroperoxide, tert-butyl perpivalate, peracid and ammonium persulfate; an azo compound such as azobisisobutyronitrile, azobiscyclohexane carbonitrile, phenylazoisobutyronitrile and azobis-dimethylvaleronitrile; and a redox catalyst. The amount of such polymerization initiator to be added is within the range of about 0.001–3% by weight based on the polymerizable monomer.

It will be seen by a worker skilled in the art that in addition to the criteria previously set forth, additives such as a cross-linking promotor and coloring agents may be added to the original solution of the present invention as needed. It is also possible to add a polymer which can be extracted from a solvent-containing gel to the original solution, for example, poly N-vinyl pyrrolidone. Not only such an extractable polymer, but also an extractable substance may be formally regarded as a part of the solvent.

The smaller is the $\gamma_o$ of the original solution, the more preferable it is. When a casting method is adopted in which the volume of a lens-shape space gradually decreases as contraction due to polymerization proceeds, even though the value of $\gamma_o$ is 15–20%, there is no possibility that hollows are brought about. However, in case the diopter of a lens is a large positive or negative value, the thickness of a lens-shape space varies depending upon the place, and so the original solution slightly flows and the memory of such flow develops after a hydration treatment, which is not desirable. From this viewpoint, it is preferable that $\gamma_o$ is less than about 10% by volume, and still more preferably less than about 5% by volume.

As preferred embodiments of compositions original solutions for producing a soft contact lens of the present invention may be mentioned:

(1) The combination, wherein N-vinyl pyrrolidone and methyl methacrylate are used as monomers, of triallyl isocyanurate, triethylene glycol and vinyl methacrylate are used as cross-linking agents, azobisdimethyl valerolactam is used as a catalyst and dimethyl sulfoxide is used as a solvent.

(2) The combination, wherein N-vinyl pyrrolidone is used as a monomer, a non-gelled copolymer of methyl methacrylate and vinyl methacrylate is used as a post cross-linkable polymer, triallyl isocyanurate is used as a cross-linking agent, azobisdimethyl valeronitrile is used as a catalyst and dimethyl sulfoxide is used as a solvent.

(3) The combination, wherein a post cross-linkable polymer obtained by hydrolyzing a vinyl pyrrolidone-vinylene carbonate polymer and thereafter esterifying the resultant hydrolyzed copolymer with methacrylate acid and a non-gelled copolymer of methyl methacrylate and vinyl methacrylate are used as polymers and N-methyl pyrrolidone is used as a solvent.

Two kinds of molds are used in the present invention, a concave mold and a convex mold. At least one of the these two molds should have an interference surface, whether spherical or paraboloidal, defining a lens surface. The term "interference surface" herein refers to a generally spherical or paraboloidal surface which has a surface roughness in its central, primary portion of not more than 50 μm and which in its circumferential, peripheral portion deviates or projects from a true spheroid or paraboloidal properties at that circumferential portion. A mold having a "non-interference" surface, as that term is used herein, is spherical or paraboloidal over the entire surface which acts to define a lens surface when the concave and convex molds are contacted as described below. It is preferable that the concave mold and the convex mold are so designed as to bring them into a linear, not surface contact.

Examples of combination of a concave mold and a convex mold used in the present invention will be explained by reference to the accompanying drawings.

FIG. 1 is a combination of a concave mold having an interference surface 1 with a convex mold having a non-interference surface 2 which is a spherical surface or paraboloid surface having no projections. This combination is especially preferable for practicing the present invention. This is because the concave mold having n interference surface is used, a lens through which tear flows well is produced, and an inner bevel (an inclined surface produced on the circumferential portion on the side of the concave surface of a lens, which has been almost indispensable for wearing a conventional contact lens) is not produced (in the case of a soft contact lens obtained by the process of the present invention, no problem is brought about for wearing such a lens even though there is no inner bevel), it is possible to easily produce a contact lens high in general usability with little deviation in quality.

Figure 2:
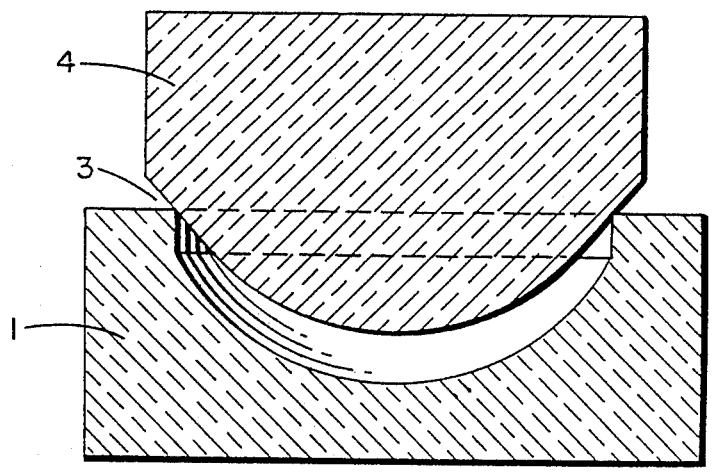

FIG. 2 is an example of combination of a concave mold having an interference surface 1 with a convex mold also having an interference surface 4, by the use of such molds, the present invention can be easily practiced. As a concave mold, what has a non-interference surface may also be used, however, except for a special mold, an outer bevel (an inclined surface produced on the circumferential portion on the side of the convex surface of a lens) is generally necessary, therefore, a concave mold having an interference surface is preferably used. On the circumferential portion of the mold surface of a convex mold, a thin groove or small hole may be produced, which results in producing a projection on the circumferential portion on the side of the concave surface of the lens and promoting flow of tear. When a hole is marked, such marked hole is also utilizable for identification of the kind. The material of a mold may be made of plastic, metal or glass, preferably glass.

Figure 3:
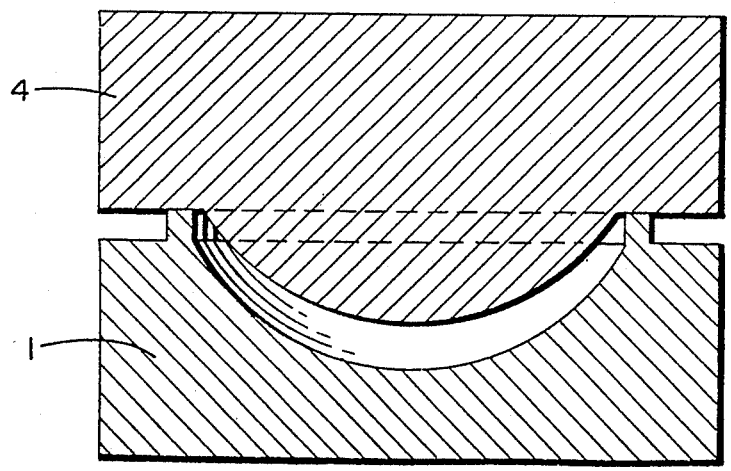

FIG. 3 is an example of a combination of a concave mold having an interference surface 1 with a convex mold also having an interference surface 4. This combination is excellent in that a lens flash produced in the overlapped surface of the molds does not contact the cornea. This combination is especially suitable for manufacturing a mold from a thermoplastic plastics or a metal by a transcription method.

In the filling step, an original solution in an excess amount is poured into a concave mold. Pouring of the excess amount is not only necessary for uniformly filling the original solution neither more nor less in a space between the concave mold and a convex mold, but also important in the following sense. Namely, in the molds shown in FIG. 1 which is preferable for practicing the process of the present invention, because there is a wedge-like space 3 in a sealed portion, an overflowed original solution is held at that space 3 to make complete the sealing. On the other hand, when polymerization contraction is brought about, the overflowed original solution is supplied from a slight gap in the sealed portion to make up for the polymerization contraction.

In case such molds are used, an amount about 5 times or more of the amount of the overflowed original solution held in said wedge-like space had better be made an excess amount of the original solution. Determination of the charging amount of the original solution may also be practiced as follows. Namely, a plurality of molds each charged with the original solution are placed, when necessary, in a sealed vessel in which air is replaced by an inert gas such as nitrogen for transferring said molds to a gel producing step, at this time, the vapor pressure of the lowest boiling point component in the original solution inside said vessel is so established as to become at least about 20% of the saturated partial pressure exhibited by the original solution. By charging such an excess of the original solution, it becomes possible to prevent a lens from enfolding bubbles and inhibit delicate change of composition of the original solution inside each mold during production of gel to enable a very high-quality lens to be obtained at a good yield.

Another mode of practice of the filling step is to fill the original solution in a sealed container. Namely, a concave mold is placed stationarily in a sealable container, the original solution is poured into the concave mold, thereafter, the entirety is inclined for placing a spherical convex mold in said container, air inside the container is degasified or replaced by an inert gas as occasion demands, and thereafter the container is sealed and lightly shaken to partly fit the convex mold in the concave mold.

In a gellation step, a polymerization and/or cross-linking reaction is caused to proceed by the action of heat, rays and electronic rays. When such reaction is caused by heat, said reaction is carried out normally at a temperature within the range from room temperature through about 120° C.

There are the following five practical methods for not producing holes and hollows by polymerization contraction of the original solution.

(a) A liquid is supplied from an overlapped surface of the concave and convex molds.
(b) Pressure acting on the original solution and/or gel in a space between the concave and convex molds is reduced to develop elastic expansion.
(c) The original solution and/or gel in a space between the concave and convex molds is heated to develop thermal expansion.
(d) A hole and/or hollow is produced at a position other than the optical area (an area within a circle having a radius within about 4 mm centering around the optical axis) in a space between the concave and convex molds.
(e) The volume V of the space between the concave and convex molds is somewhat decreased during a process from initiation through termination of the polymerization reaction.

When, as mentioned above, the overflowed original solution is held in a sealed portion of the molds, in case the pressure inside the molds becomes minus by polymerization contraction, the original solution is naturally absorbed from the overlapped surface of the two molds, by which the method (a) is realized. This method is preferable in a metal mold rather than in a plastic mold and most preferable in a glass mold. In the case of glass molds, a gap on the overlapped surface becomes large sometimes, in such case the concave and convex molds are squeezed from up and down with a force of 10–200 kg f, preferably about 50 kg f.

The liquid to be supplied is an overflowed original solution in the aforesaid case, however, it is not limited to the original solution, but a monomer and a solvent will suffice.

The original solution is sealed in a pressurized, compressed state within the molds and as the polymerization proceeds, the internal pressure automatically lowers, by which the method (b) is achieved.

The original solution is pressurized by heating and pressing in by a pump of the original solution in a sealed space.

For sealing the overlapped surface of the concave and convex molds, when squeezing of the concave and convex molds from up and down results in incomplete sealing, the concave and convex molds are placed inside an autoclave and the original solution is filled outside these molds also but inside said autoclave, by which a satisfactory result is obtained.

The method (c) is achieved by gradually elevating the temperature of the original solution as polymerization progresses.

The thermal expansion coefficient of a monomer is not large, however, the following two solutions are effective. One is to mix the monomer with a solvent large in thermal expansion coefficient and carry out a solution polymerization. The other is to carry out a reaction at temperatures ranging from a low temperature immediately before freezing through a high temperature immediately before decomposition. In this case, because a proper thermal polymerization catalyst is not obtained, an electron ray polymerization is desirable.

The method (d) is to eliminate overall contraction of the entirety by bringing about hollows in harmless positions. Such positions are an outer bevel or an inner bevel of a lens. In order to continuously produce hollows in that positions, foaming nuclei had better be provided on the outer bevel portion of the concave mold. As such foaming nuclei, a rough surface of the molds, contamination caused by foreign matters such as a very small amount of oil or grease and a plastic fiber are preferable.

The method (e) is achieved by gradually decreasing the volume of a lens-shape space V as polymerization proceeds.

When the decreasing amount of V during the polymerization is named $\Delta V$, up to about $\Delta V/V = 3\%$ can be practiced the process of the present invention. In the case of glass molds, when an assembly of concave and convex molds is squeezed by a force of about 100 kg f, a volume decrease of about 2% is achieved.

Of the foregoing methods, what is preferable in performance of an obtained lens is (a), (b), and (c), and (d) and (e) had better be used as auxiliary means. These methods are used in proper admixture.

Peeling of a solvent-containing gel from molds had better be carried out in a liquid, especially in an aqueous solution, Namely, an assembly of the concave and convex molds per se is immersed in the liquid. Since contact of the overlapped surface of said assembly with the liquid would suffice, the entire molds need not be immersed. By peeling in the liquid, it is possible to drastically reduce the damaging ratio of a lens. This effect is especially remarkable when glass molds are used.

When peeling operations are carried out in water, substitution of a solvent contained in the gel with water could be continuously carried out per se.

The liquid used upon peeling is not particularly limited insofar as it does not adversely affect the lens, however, in general, a solvent the same as used in the original solution added with water is preferably used. In case N-vinyl pyrrolidone is selected as the component A and methyl methacrylate is selected as the component B of the original solution, peeling had better be carried out in dimethyl sulfoxide or water. These may be called solvents weaker in action for swelling the gel than the solvent contained in the original solution.

An extraction step is a step of subjecting the peeled lens to an extraction treatment with water (including physiological saline and other aqueous solutions). At this time, the monomer(s), polymer(s), cross-linking agent, catalyst and solvent elute, while water and an artificial tear solution flow in.

When this step is completed, a hydrated gel whose percent transmission of visible rays is more than about 90% per thickness of 0.1 mm, is obtained.

EXAMPLE 1

A concave mold used in this example is made of a low-pressure polyethylene, having a shape like 1 of FIG. 2, the radius of curvature and the diameter of which are 7.5 mm and 13 mm, respectively. A convex mold used in this example is a glass ball having a radius of curvature of 8 mm. A gap in the central portion(s) is 0.9 mm.

Composition of an original solution for polymerization is a mixture of hydrophilic monomers and solvents as shown below.

hydroxyethyl methacrylate (HEMA)—70 g,
N-vinyl pyrrolidone (NVP)—30 g,
acrylic acid—2 g,
ethyleneglycol dimethacrylate (EGDMA)—1.5 g,
triallyl isocyanurate (TAIC)—0.5 g,
ammonium persulfate—2 g,
ethylene glycol—150 g,
water—150 g.

The original solution in an amount in excess by 20 μl was poured into the concave mold and the convex mold was carefully placed thereon around the center of the former. Because the excess amount of said solution was considerably large, a probability of enfolding bubbles was low.

The two molds were clamped by a force of 0.5 kgf and the original solution was polymerized inside a hot air oven, said solution was heated at 60° C. for 16 hours and then at 90° C. for 4 hours. The $\gamma_o$ of the original solution was 3.5%, a greater part of which, however, was made up for by reduction of the volume of the molds.

After immersing an assembly of the two molds in water, the clamps were loosened, said assembly was allowed to stand for overnight per se in water and the two molds were separated in water. By so doing, a ratio of breaking the circumference of the lens decreased by about 10% as compared with a case of loosening the clamps in air and separating the two molds in air.

Because a lens adhered to the concave mold, when said mold was allowed to stand in water for 5 hours, the lens naturally peeled from said mold.

The water content was about 75% in water at pH 8 and the lens having non-destroyed edge was obtained. The percent transmission of rays was 85%.

In order to know the approximate value of the tensile strength of the solvent-containing lens, after being heated at 90° C. for 4 hours, the lens was taken out into air, the convex mold was separated from the concave mold and the lens was peeled by a pair of tweezers. From the finger touch at that time, the tensile strength of the lens was inferred to be about 2-0.5 kgf/cm$^2$.

EXAMPLE 2

Using the same molds and the same original solution as used in Example 1, the original solution was charged by the same method, thereafter, the two molds were clamped by a force of 0.5 kgf and the original solution was polymerized in water. After heating the two molds under the same conditions as in Example 1, the clamps per se were loosened in water, the two molds were allowed to stand in water for overnight and thereafter the two molds were separated. A lens whose edge was little destroyed was obtained.

EXAMPLE 3

A concave mold used in this example was a non-interference sphere made of glass having a radius of curvature of 7 mm and a diameter of 13 mm. A convex mold used was the same as that used in Example 1. The gap in the central portion(s) was 1 mm. At the contact portion of the two molds, a wedge-like space like 3 in FIG. 1 was provided. Both of the two molds being non-interference spherical surface, a lens becomes a thick concave lens having a crescent-like sectional configuration.

Composition of an original solution for polymerization was as follows, a mixture of a hydrophilic monomer, a hydrophobic monomer and a solvent.

NVP—70 g,
methyl mechacrylate (MMA)—30 g,
TAIC—1 g,
triethyleneglycol dimethacrylate (TEGDMA)—3 g,
vinyl methacrylate (VMe)—0.5 g,
azobisdimethyl valeronitrile (ADVN)—0.1 g,
dimethyl sulfoxide (DMSO)—400 g.

The $\gamma_o$ of this original solution was about 3.5%.

The concave mold was placed inside a high-rigidity, pressure-resistant 5000 kgf/cm$^2$ autoclave, the original solution was overflowingly poured inside the autoclave and the autoclave was covered. Heating was effected at 40° C. until 9.5th hour, 50° C. until 11.2th hour, 60° C. until 13.7th hour, 70° C. until 14.1th hour, 80° C. until 14.9th hour, thereafter the autoclave was smoothly heated at 90° C. until 15.8th hour, and thereafter the autoclave was allowed to stand until 18th hour. While care was taken so as not to cool the autoclave, an assembly of the concave mold and convex mold was quickly taken out and immediately immersed in a treating liquid. The treating liquid was a 70% aqueous solution of DMSO (at 95° C.), after 5 hours, the convex mold was separated from the concave mold, said concave mold was immersed in a 10% aqueous solution of DMSO (at 95° C.) for 5 hours. During the period, a lens naturally peeled from the concave mold. Although the circumference of the lens was very thin, the lens free from damage was obtained. When the lens was boiled in water for overnight, it became a transparent soft contact lens.

In order to know the approximate value of the tensile strength of the solvent-containing lens, the concave and convex molds taken out from the autoclave were separated in air and the solvent-containing lens was peeled by a pair of tweezers. From the finger touch at that time, the tensile strength of the lens was inferred to be about 1-0.1 kgf/cm$^2$.

The hydrated lens had a water content of 75%, a percent transmission of rays of 85% and a tensile strength of 4 kgf/cm$^2$.

EXAMPLE 4

An experiment showing toughness of a pressure polymerization was carried out. The temperature elevation program of Example 3 was changed to elevation of temperature at a slow speed, which was made an optimum value in an atmospheric pressure polymerization shown in Example 5.

Increase of a hollow occurring ratio due to polymerization contraction was hardly recognized. Number of flashes brought about in the overlapped surface of the two molds was rather small. This was recognized to be the slowest speed temperature elevation. The pressure inside a space between the molds at this time was inferred to be always close to atmospheric pressure. Accordingly, the inner pressure in Example 3 is guessed to have been considerably high.

As such, in a pressure polymerization, the range which could be taken by the temperature elevation program is broad, which is contrastive to delicacy of a pressure polymerization inferred from Example 5.

EXAMPLE 5

Molds the same as used in Example 3 were used. A concave mold was placed horizontally on the bottom of an autoclave in advance, on which was placed a convex mold, from the overlapped surface of the two molds, a needle was inserted to inject about 1 ml of an original solution the same as used in Example 3 and the needle was pulled out. Bubbles were hardly enfolded. The overflowed original solution wetted the circumference of the concave mold to say nothing of a wedge-like space, being accumulated on the bottom of the autoclave. The autoclave was filled with nitrogen gas and covered. The inside of the autoclave must be filled with the vapor of the original solution.

A polymerization was carried out according to the following temperature elevation program, connecting smoothly the following temperature elevation curve.

Until 8¼th hour—39° C.,
At 9¼th hour—46° C.,
At 10¼th hour—50.5° C.,
At 11½th hour—54° C.,
At 12th hour—56° C.,
At 12½th hour—60° C.,
At 13th hour—74° C.,
At 14th hour—84.5° C.,
From 14½th hour through 16th hour—90° C.

The steps thereafter were the same as those in Example 3.

An obtained lens was, the same as in Example 3, low in damaging ratio with few hollows, having about the same values of the physical properties. This temperature elevation program was the values in atmospheric pressure polymerization and when the temperature changed by ±3° C. (for over 10 minutes) from the values mentioned above, a lens with many hollows and (flange-like projections) tended to be produced.

EXAMPLE 6

A part of Example 5 was charged. Namely, after squeezing the assembly of the concave mold and the convex mold with an outer force of 50 kgf, the autoclave was covered.

A temperature elevation program the same as in Example 5 was optimum, however, it was seen that a more severe precision was required in this example as compared with that of Example 5.

Number of flashes in the circumference of an obtained lens was small. There were no large difference in damaging ratio in concomitance with peeling, occurring ratio of hollows and value of the physical properties between the lens of this example and the lens of Example 5.

EXAMPLE 7

A concave mold used in this example was made of glass, having an interference spherical surface like that of 1 in FIG. 1, having a radius of curvature of about 9 mm and a diameter of 13 mm. Because said mold was manufactured manually by fire forging, the precision of the optical surface was very poor. As a convex mold, what was used in Example 1 was used. The gap in the central portion(s) was about 0.4 mm.

Composition of an original solution for polymerization was, as shown below, a mixture of a hydrophilic monomer, a post cross-linkable hydrophobic polymer and a solvent.

post cross-linkable polymethyl methacrylate (PMMA*)—28 g,
NVP—75 g,
TAIC—1 g,
ADVN—0.1 g,
DMSO—416 g.

Using this original solution for polymerization, by the method of Example 5, a polymerization was effected. The solvent contained in an obtained lens was substituted with water (allowed to stand in boiling water for 16 hours), thereafter said lens at 37° C. was a well transparent soft contact lens-like matter having a water content of about 80% and a tensile strength of about 10 kgf/cm².

Said post cross-linkable polymethyl methacrylate was synthesized by the following method.

MMA—99 g,
VMe—1 g,
ADVN—0.1 g,
DMSO—400 g.

A composition consisting of the aforementioned components was charged in a 1-liter 3-neck flask equipped with a stirrer, air inside said flask was substituted by argon, thereafter, said composition in said flask was stirred inside a 50° C. water vessel to precipitate a viscous solution in a state of very fine powder. The precipitate was removed of the solvent by centrifugation, thereafter, washed twice with fresh methanol, dried in vacuo at a temperature not more than 40° C. for about 24 hours until the amount thereof became constant, and what was obtained was used.

The obtained polymer had an $[\eta] \doteq 0.8$ and the yield was about 30 g.

EXAMPLE 8

In the process of Example 7, what was synthesized by the following method was used as a post cross-linkable polymer.

MMA—95 h,
glycidyl methacrylate (GMA)—5 g,
ADVN—0.6 g,
n-dodecylmercaptan (n-DSH)—0.14 g,
DMSO—233 g.

A composition consisting of the aforesaid components was polymerized at 50° C. for 9.5 hours in the same manner as the synthesis of a polymer in Example 7. An obtained polymer was refined and dried. The resulting polymer had a yield of about 33 g and an $[\eta] \doteq 0.5$.

In order to add methacrylic acid to this polymer, the following reaction was carried out.

| | |
|---|---|
| said polymer | 10 g |
| methacrylic acid (MeAA) | 6 g |
| trimethyl benzylammonium chloride (TMBAC) | 1 g |
| Topanol (phonetic) A | 0.05 g |
| 1,2-dichloroethane | 80 g |

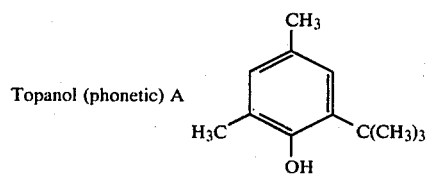

A composition consisting of the aforesaid components was charged in a 300-ml, 3-neck flask equipped with a stirrer. Said composition in said flask was reacted in a water vessel at 80° C. for 8 hours. After the reaction, an obtained reaction product was precipitated so as to become very fine powder in methanol, removed of the solvent by centrifugation, thereafter washed twice with methanol and used for a polymerization. As a result of examining by a method of nuclear magnetic resonance, about 3% (weight in the polymer) of methacrylic group was contained.

As a result of measurement of viscosity, the resultant polymer exhibited about the same viscosity as that of the starting polymer. The obtained lens after substitution of the solvent contained by water had a somewhat weaker tensile strength, but it gave a well transparent lens-like matter.

EXAMPLE 9

In Example 7, the cross-linking agent in the original solution for a polymerization only was changed. Namely, composition of the original solution was as follows.

PMMA*—28 g,
NVP—75 g,
ethylidene-bis-3-(N-vinyl-2-pyrrolidone) (ENVP)—1 g,
ADVN—0.6 g,
DMSO—416 g.

The obtained lens after its solvent was substituted by water was a lens-like matter high in transparency than that of Example 7.

EXAMPLE 10

In Example 8, only the cross-linking agent in the original solution for a polymerization was changed. Namely, composition of the original solution was as follows.

PMMA*—28 g,
NVP—75 g,
MeV—1 g,
ADVN—0.1 g,
DMSO—416 g.

The obtained lens after its solvent was substituted by water was a lens-like matter as transparent as that of Example 7.

EXAMPLE 11

Method of synthesizing post cross-linkable polyvinyl pyrrolidone

N-vinyl pyrrolidone and vinylene carbonate were polymerized.

NVP—29.1 g,
vinylene carbonate (VCa)—0.9 g,
ADVN—0.03 g,
benzene—70 g.

An original solution for a polymerization consisting of the aforesaid components was put in a 300-ml, 3-neck flask equipped with a stirrer, air inside the flask was substituted by argon, and said solution was polymerized with stirring at 50° C. for 7 hours.

After the polymerization, a polymer was precipitated in petroleum benzine.

The polymer was dried in vacuo at 70° C. and the yield was 14 g.

Six grams of the obtained polymer was dissolved in 100 g of a 40% aqueous solution of hydrazine, allowed to stand at room temperature for 3 days, thereafter removed of water by an evaporator, further dissolved in water, and thereafter hydrazine was completely removed therefrom by an ion exchange resin.

After removal of hydrazine, the polymer was dehydrated by the evaporator and further dried in vacuo. Four grams of the dried polymer was dissolved in 50 g of dried methylene chloride, into the resultant solution was added dropwise a mixture of 2 g of methacrylic acid chloride and 8 g of dried methylene chloride at room temperature with stirring. After completion of the dropping, the resultant mixture was allowed to stand with stirring for 2 hours to precipitate in petroleum benzine.

The obtained polymer was measured with methanol heavy hydride being used as a solvent to confirm that a methacrylic acid group was introduced.

What is claimed is:

1. An original solution for producing a soft contact lens comprising:
   A. a hydrophilic polymer or monomer that, when polymerized, gives a hydrophilic polymer;
   B. a hydrophobic polymer of a monomer selected from the group consisting of a lower alkyl ester of acrylic or methacrylic acid, an unsaturated nitrile, an aromatic olefin, a hydrophobic ortho-lactone, a glycidyl ester of acrylic or methacrylic acid and a mixture thereof or a hydrophobic copolymer of said monomer with a compound selected from the group consisting of acrylic acid, methacrylic acid, a vinyl ester of acrylic acid and a vinyl ester of methacrylic acid; said hydrophobic polymer or copolymer having a plurality of side chains, each side chain containing a post cross-linkable group; and
   C. a solvent wherein the weight ratio of A:B is from about 85:15 to about 55:45 and C is present in a quantity of from about 50 to 95% by weight, based on the original solution.

2. An original solution of claim 1, wherein said monomer of the component A is N-vinyl lactam, N-vinyl oxazolidone, a hydroxy lower alkyl ester of acrylic acid, a hydroxy lower alkyl ester of methacrylic acid, glycerin monoacrylate, glycerin monomethacrylate or a hydrophilic ortho-lactone.

3. An original solution of claim 1, wherein said hydrophilic polymer of the component A is (i) a polymer consisting of at least one kind of monomer selected from the group consisting of N-vinyl lactam, N-vinyl oxazolidone, a hydroxy lower alkyl ester of acrylic acid, a hydroxy lower alkyl ester of methacrylic acid, glycerin monoacrylate, glycerin monomethacrylic and a hydrophilic ortho-lactone or (ii) a polymer obtained by introducing a post cross-linkable functional group to polyvinyl alcohol.

4. An original solution of claim 1, wherein said hydrophilic polymer of the component A is that which is obtained by hydrolyzing an N-vinyl pyrrolidone-vinylene carbonate copolymer and thereafter reacting the hydrolyzed copolymer with methacrylic acid.

5. An original solution of claim 1, wherein said hydrophobic polymer of the component B is a polymer obtained by reacting a copolymer of a lower alkyl ester of acrylic acid or methacrylic acid, an unsaturated nitrile, an aromatic olefin or a hydrophobic ortho-lactone and glycidyl ester of acrylic acid or methacrylic acid with acrylic acid or methacrylic acid.

6. An original solution of claim 1, wherein said hydrophobic polymer of the component B is a polymer obtained by copolymerizing a lower alkyl ester of acrylic acid or a lower alkyl ester of methacrylic acid, and a vinyl ester of acrylic acid or a vinyl ester of methacrylic acid, and stopping the polymerization before the obtained polymer gels.

7. An original solution for producing a soft contact lens which comprises N-vinyl pyrrolidone, a methyl methacrylate-glycidyl methacrylate copolymer which is esterified with methacrylic acid and/or a methyl methacrylate-vinyl methacrylate copolymer, triallyl isocyanurate, azobisdimethyl valeronitrile and dimethyl sulfoxide.

8. An original solution for producing a soft contact lens which comprises a hydrolyzed copolymer of N-vinyl pyrrolidone and vinylene carbonate which is esterified by methacrylic acid, a methyl methacrylate-glycidyl methacrylate copolymer which is esterified by methacrylic acid and/or a methyl methacrylate-vinyl methacrylate copolymer, triallyl isocyanurate, azobisdimethyl valeronitrile and N-methyl pyrrolidone.

9. An original solution of claim 1, wherein the B component is a hydrophobic polymer having plural ethylenic double bonds in its side chains as post-cross-linkable groups.

10. An original solution of claim 1, wherein the B component is obtained by radical polymerization.

* * * * *